United States Patent
Lindner et al.

(10) Patent No.: US 10,131,759 B2
(45) Date of Patent: Nov. 20, 2018

(54) POLYURETHANE FOAM AND PROCESS FOR PRODUCING SAME

(71) Applicant: Covestro Deutschland AG, Leverkusen (DE)

(72) Inventors: Stefan Lindner, Remscheid (DE); Wolfgang Friederichs, Köln (DE); Meike Niesten, Köln (DE); Reinhard Strey, Dormagen (DE); Thomas Sottmann, Stuttgart (DE); Niels Becker, Köln (DE); Agnes Chalbi, Köln (DE); Diana Engelen, Leverkusen (DE); Paul Heinz, Köln (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/033,929

(22) PCT Filed: Nov. 7, 2014

(86) PCT No.: PCT/EP2014/074038
§ 371 (c)(1),
(2) Date: May 3, 2016

(87) PCT Pub. No.: WO2015/067751
PCT Pub. Date: May 14, 2015

(65) Prior Publication Data
US 2016/0264749 A1    Sep. 15, 2016

(30) Foreign Application Priority Data
Nov. 8, 2013  (EP) ..................... 13192109

(51) Int. Cl.
*C08J 9/14*     (2006.01)
*C08J 9/12*     (2006.01)
*C08G 18/70*   (2006.01)
*C08G 18/80*   (2006.01)
*C08G 101/00*  (2006.01)

(52) U.S. Cl.
CPC ........... *C08J 9/146* (2013.01); *C08G 18/705* (2013.01); *C08G 18/8048* (2013.01); *C08J 9/122* (2013.01); *C08J 9/141* (2013.01); *C08J 9/148* (2013.01); *C08G 2101/00* (2013.01); *C08J 2201/022* (2013.01); *C08J 2203/06* (2013.01); *C08J 2203/08* (2013.01); *C08J 2203/14* (2013.01); *C08J 2203/142* (2013.01); *C08J 2203/144* (2013.01); *C08J 2375/02* (2013.01); *C08J 2375/04* (2013.01)

(58) Field of Classification Search
CPC ............. C08G 18/705; C08G 18/8048; C08G 2101/00; C08J 9/122; C08J 9/141; C08J 9/146; C08J 9/148; C08J 2201/022; C08J 2203/06; C08J 2203/08; C08J 2203/14; C08J 2203/142; C08J 2203/144; C08J 2375/02; C08J 2375/04
See application file for complete search history.

(56) References Cited

U.S. PATENT DOCUMENTS

| | | | |
|---|---|---|---|
| 3,672,955 A | 6/1972 | Stanley | |
| 5,670,601 A * | 9/1997 | Allen | C08G 18/10 525/123 |
| 6,051,622 A * | 4/2000 | Kinkelaar | C08G 18/10 521/130 |
| 6,809,124 B2 | 10/2004 | Sulzbach et al. | |
| 9,023,909 B2 | 5/2015 | Lindner et al. | |
| 2004/0254256 A1* | 12/2004 | Lockwood | C08G 18/1833 521/174 |
| 2006/0127663 A1 | 6/2006 | Strey et al. | |
| 2014/0045960 A1 | 2/2014 | Lindner et al. | |
| 2014/0066534 A1 | 3/2014 | Steinmeister et al. | |
| 2015/0259496 A1* | 9/2015 | Albers | C08G 18/4018 521/131 |

FOREIGN PATENT DOCUMENTS

| | | |
|---|---|---|
| DE | 10260815 A1 | 7/2004 |
| DE | 102011050014 A1 | 10/2012 |
| WO | WO-01098389 A1 | 12/2001 |
| WO | WO-2011054868 A1 | 5/2011 |
| WO | WO-2012146568 A2 | 11/2012 |

OTHER PUBLICATIONS

International Search Report for PCT/EP2014/074038 dated Jan. 16, 2015.

* cited by examiner

*Primary Examiner* — John M Cooney
(74) *Attorney, Agent, or Firm* — K&L Gates LLP

(57) ABSTRACT

A polyurethane foam, polyisocyanurate foam or polyurea foam is obtainable from the reaction of a mixture comprising A) a compound reactive towards isocyanate ("NCO-reactive compound"); B) a blowing agent selected from the group comprising linear, branched or cyclic C1 to C6 hydrocarbons, linear, branched or cyclic C1 to C6 fluorocarbons, $N_2$, $O_2$, argon and/or $CO_2$, where the blowing agent B) is present in the supercritical or near-critical state; C) a polyisocyanate; D) an amphiphilic isocyanate; and E) optionally a surfactant and F) optionally other auxiliaries and additives. The invention further relates to the production of this polyurethane foam, where the blowing agent is emulsified in the isocyanate component containing amphiphilic isocyanate.

8 Claims, 1 Drawing Sheet

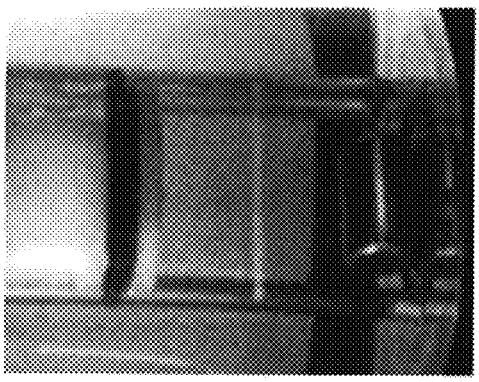
Example 4
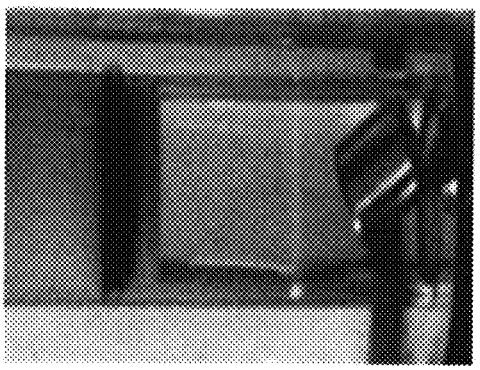
Example 5
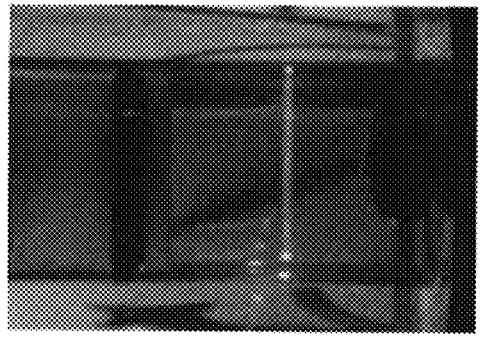
Example 6

POLYURETHANE FOAM AND PROCESS FOR PRODUCING SAME

CROSS-REFERENCE TO RELATED APPLICATIONS

This application is a national stage application (under 35 U.S.C. § 371) of PCT/EP2014/074038, filed Nov. 7, 2014, which claims benefit of European Application No. 13192109.0, filed Nov. 8, 2013, both of which are incorporated herein by reference in their entirety.

The present invention relates to a polyurethane foam obtainable from the reaction of a mixture comprising A) an isocyanate-reactive compound; B) a blowing agent selected from the group comprising linear, branched or cyclic $C_1$- to $C_6$-hydrocarbons, linear, branched or cyclic $C_1$- to $C_6$-(hydro)fluorocarbons, $N_2$, $O_2$, argon and/or $CO_2$, wherein the blowing agent B) is in the supercritical or near-critical state; C) a polyisocyanate, D) an amphiphilic isocyanate and optionally E) a surfactant and optionally F) further auxiliary/added substances.

The invention further relates to a process for producing such a polyurethane foam.

In the context of this application the term "polyurethane foam" also comprehends polyurea and polyisocyanurate foams,

BACKGROUND OF THE INVENTION

Nanocellular or nanoporous polymer foams are particularly good thermal insulation materials on the basis of theoretical considerations. This is because the internal dimensions of nanofoams are of the order of the mean free path length of a gas molecule. The gas contribution to heat transfer can be reduced in this way. Polyurethanes are a group of polymers which are frequently used in thermal insulation.

Polyurethane foams are produced by reacting a polyol component, which also contains a blowing agent, with an isocyanate. The reaction of isocyanate with water forms carbon dioxide, which also acts as a blowing agent.

The decisive step for foam formation, and hence for the later cell size of the cured foam, is the nucleation provided by blowing agents, since every cell in the foam has been formed from a gas bubble. A relevant observation here is that, after nucleation, no new gas bubbles are generally produced, but instead blowing agent diffuses into existing gas bubbles.

Addition of stabilizers promotes the emulsification of the various components, influences nucleation and prevents coalescence of growing gas bubbles. They also influence cell opening. In open-cell foams, the membranes of the growing pores are opened and the struts of the pores are left standing.

One possible approach is to emulsify a supercritical blowing agent into the reaction mixture and then to cure the foam after reducing the pressure. The POSME method (principle of supercritical micro emulsion expansion) is known as a variant thereof. The blowing agent is present therein in the form of a microemulsion. Microemulsions form under certain conditions which depend inter alia on the concentration of emulsifiers and on the temperature. Microemulsions are notable for their stability and for the fact that the nonpolar phase, i.e., the blowing agent in this case, can be present within the polar phase in very small droplets. The diameters of such droplets can range from 1 to 100 nanometers, DE 102 60 815 A 1 discloses foamed material and a process for producing the foamed material. Foamed material comprising foam bubbles in nanosize is supposed to be produced without having to surmount the energy barrier typical of phase conversions and nucleus-forming processes. An associated goal is to produce, in a controllable manner, a foamed material that has a numeric density of foam bubbles between $10^{12}$ and $10^{18}$ per $cm^3$ and also an average diameter for the foam bubbles of between 10 nm and 10 µm. The foundation is the dispersion of a second fluid in the form of pools in a matrix of a first fluid. A reaction space contains the first fluid as a matrix and the second fluid in pools. A change in pressure and/or temperature is used to convert the second fluid into a near-critical or supercritical state with a density close to that of a liquid. The second fluid is therefore fully or almost fully in the form of pools which have a uniform distribution in the entire first fluid. Depressurization causes the second fluid to revert to a state of gaseous density, while the pools inflate into foam bubbles of nanometer size. No energy barrier has to be surmounted, nor do the blowing agent molecules have to diffuse to the expanding bubbles.

Any polymerizable substance is said to be generally useful as first fluid. However, express mention is only made of acrylamide, which polymerizes to give polyacrylamide, and melamine, which polymerizes to give melamine resin. The second fluid should be selected from a group of materials which comprises hydrocarbons such as methane or ethane, alkanols, (hydro)chlorofluorocarbons or $CO_2$. A further material used is an amphiphilic material that should have at least one block with affinity for the first fluid and at least one block with affinity for the second fluid.

WO 2012/146568 discloses a polyurethane foam obtainable from the reaction of a mixture comprising A) an isocyanate-reactive compound; B) a blowing agent selected from the group comprising linear, branched or cyclic C1- to C6-hydrocarbons, linear, branched or cyclic C1- to C6-(hydro)fluorocarbons, $N_2$, $O_2$, argon and/or $CO_2$, wherein the blowing agent B) is in the supercritical or near-critical state; and C) a polyisocyanate.

The isocyanate-reactive compound A) comprises a hydrophobic part and has a hydrophilic part and an average hydroxyl functionality of greater than 1. The hydrophobic part comprises a saturated or unsaturated hydrocarbon chain having at least six carbon atoms and the hydrophilic part comprises alkylene oxide units and/or ester units.

BRIEF SUMMARY OF THE INVENTION

The present invention has for its object the provision of nanocellular polyurethane foams producible by an approach which represents an alternative to the process described in WO 2012/146568 but where the blowing agent is likewise stabilized in a microemulsion.

This object is achieved according to the invention by a polyurethane foam Obtainable from the reaction of a mixture comprising:
A) an isocyanate-reactive compound ("NCO-reactive compound");
B) a blowing agent selected from the group comprising linear, branched or cyclic $C_1$- to $C_6$-hydrocarbons, linear, branched or cyclic $C_1$- to $C_6$-(hydro)fluorocarbons, $N_2$, $O_2$, argon and/or $CO_2$, wherein the blowing agent B) is in the supercritical or near-critical state;
C) a polyisocyanate;
D) an amphiphilic isocyanate; and
E) optionally a surfactant and
F) optionally further auxiliary/added substances.

It has now been found that, surprisingly, the use of an amphiphilic isocyanate D) also makes it possible to produce microemulsions of the blowing agent, in particular of $CO_2$, that may be further processed into polyurethane foams. As a result, the blowing agent is in a time state of subdivision in its own phase which makes it possible to produce foams which are particularly finely cellular. Use of the blowing agent mixture in the supercritical or near-critical state does away with the need for a nucleation step. It is therefore possible to produce foams that are finely cellular.

BRIEF DESCRIPTION OF THE DRAWINGS

FIG. 1 is a picture illustrating non-limiting examples of mixtures comprising amphiphilic isocyanates according to the present disclosure which are subjected to a laser beam.

DETAILED DESCRIPTION OF THE INVENTION

Component D), the amphiphilic isocyanate, is a compound composed of a polar (hydrophilic) part and a nonpolar (hydrophobic/lipophilic) part. The component D) may thus be regarded as a surfactant but also as a coreactant in polyurethane production.

Surfactants may be characterized by the HLB value (hydrophilic-lipophilic balance) which is determined by the mass ratio of the hydrophilic and lipophilic portion. The HLB value for nonionic surfactants may be calculated as follows: HLB=20×(1-Mh/M), wherein Mh is the molar mass of the hydrophobic portion of a molecule and M is the molar mass of the entire molecule. The HLB value for an amphiphilic isocyanate may be, for example, 1 to 18, preferably 2 to 17, particularly preferably 3 to 16.

The amphiphilic isocyanates D) may be produced by reaction of polyisocyanates with polar or nonpolar compounds which bear Zerewitinoff-active hydrogen atoms (for example OH, NH) and are thus isocyanate-reactive. In what follows, compounds from this class are referred to singly or collectively as "the OH component".

Depending on the choice of the polyisocyanate and the OH component the OH component may constitute the hydrophobic (lipophilic) or hydrophilic portion m the amphiphilic isocyanate.

The determination of which moiety is "hydrophilic"or"lipophilic" in the amphiphilic isocyanate is based not on absolute polarity values for the relevant molecule part but on which moiety has the higher affinity to substances of greater polarity. The amphiphilicity is thus determined based on a relative difference in polarity between the moieties.

For instance when an OH component selected from one or more compounds of the group comprising monohydric and polyhydric alcohols, fatty alcohols, amines and amino alcohols comprising a saturated or unsaturated hydrocarbon chain having at least four carbon atoms is employed, the OH component forms the hydrophobic portion and the polyisocyanate forms the hydrophilic portion in the amphiphilic isocyanate.

For example when monofunctional or polyfunctional polyalkylene oxides comprising a high proportion of ethylene oxide are employed as OH component then this forms the hydrophilic portion and the polyisocyanate forms the hydrophobic portion in the amphiphilic isocyanate.

The amphiphilic isocyanate D) is typically produced by reaction of the isocyanate-reactive groups of the OH component with the NCO groups of the polyisocyanate. This comprises linking the polyisocyanate and the OH component with one another, for example via a urethane group or a urea group. An excess of isocyanate groups in the reaction mixture ensures that an NCO— functional, urethane- and/or urea-containing amphiphilic isocyanate is obtained.

The polyisocyanate employed for producing the amphiphilic isocyanate is an isocyanate having an average NCO functionality of ≥2.

Examples of such useful polyisocyanates include 1,4-butylene diisocyanate, 1,5-pentane diisocyanate, 1,6-hexamethylene diisocyanate (HDI), isophorone diisocyanate 2,2,4- and/or 2,4,4-trimethythexamethylene diisocyanate, the isomeric bis(4,4'-isocyanatocyclohexyl)methanes or their mixtures of any desired isomer content, 1,4-cyclohexylene diisocyanate, 1,4-phenylene diisocyanate, 2,4- and/or 2,6-tolylene diisocyanate (TDI), 1,5-naphthylene diisocyanate, 2,2- and/or 2,4'- and/or 4,4'-diphenylmethane diisocyanate (MDI) and/or higher homologs (polymeric MDI), 1-3- and/or 1,4-bis(2-isocyanatoprop-2-yl)benzene (TMXDI), 1,3-bis(isocyanatomethyl)benzene (XDI) and also alkyl 2,6-diisocyanatohexanoates (lysine diisocyanates) having C1 to C6-alkyl groups. Preference among these is given to an isocyanate from the series of diphenylmethane diisocyanate.

In addition to the abovementioned polyisocyanates, it is also possible to use proportions of modified diisocyanates of uretdione, isocyanurate, urethane, carbodiimide, uretonimine, allophanate, biuret, amide, iminooxadiazinedione and/or oxadiazinetrione structure, and also unmodified polyisocyanate having more than 2 NCO groups per molecule, for example 4-isocyanatomethyl-1,8-octane diisocyanate (nonane triisocyanate) or triphenylmethane 4,4,4'-triisocyanate.

Compounds employable as the OH component comprise hydroxyl and/or aminic functions.

Examples of such compounds include monohydric or polyhydric alcohols or fatty alcohols comprising a saturated or unsaturated hydrocarbon chain having at least four carbon atoms, for example the isomeric alkanol compounds, for example butanols, hexanols, octanols, decanols, tridecanols and hexadecanols and also 2-ethyl-1-hexanol, 12-hydroxystearyl alcohol, oleyl alcohol, erucyl alcohol, linoleyl alcohol, linolenyl alcohol, arachidyl alcohol, gadoleyl alcohol, erucyl alcohol and brassidyl alcohol.

Preference is given to butanols, in particular 1-butanol, hexanols, octanols, in particular 2-ethyl-1-hexanol, decanols, hexadecanols 12-hydroxystearyl alcohol and oleyl alcohol.

Examples of polyhydric alcohols include the isomeric alkanediol compounds, for example the butanediols, pentanediols, hexanediols, heptanediols, octanediols and the higher molecular weight α,ω-alkanediols having 9 to 18 carbon atoms, in particular 2-methyl-1,3-propanediol, 2,2-dimethyl-1,3-propanediol, 2-butyl-2-ethyl-1,3-propanediol and polyhydric alcohols such as 1,2,6-hexanetriol, 1,1,1-trimethylolpropane, 2,2-(bis(hydroxymethyl)-1,3-propanediol, 1,2,4-butanetriol, 1,2,6-hexanetriol, bis(trimethylolpropane), pentaerythritol, mannitol, methyl glycoside, dimer diol (=hydrogenation product of dimer fatty acid methyl ester) and castor oil. Preference is given to the butanediols, pentanediols, hexanediols, heptanediols and octanediols, in particular 2-methyl- 1,3-propanediol, 2,2-dimethyl-1,3-propanediol and 2-butyl-2-ethyl-1,3-propanediol, and 1,2,6-hexanetriol, 1,1,1-trimethylolpropane, 2,2-(bis(hydroxymethyl)-1,3-propanediol, 1,2,4-butanetriol, 1,2,6-hexanetriol, dimer diol and castor oil.

Further preferred alcohols are monofunctional or polyfunctional polyalkylene oxides having an OH number of 10 to 600, preferably of 20 to 112, which may have an ethylene oxide content of from 50 to 100 mol %, preferably 60 to 100 mol %, based on the total amount of the oxyalkylene groups present, for example, inter alia, methoxy(polyethylene oxide).

Amines useful for the amphiphilic isocyanates are monofunctional or polyfunctional amines having at least four carbon atoms. Examples include primary monoamines, for example 1-butylamine, 1-hexylamine, 2-ethylhexylamine, 1-octylamine, 1-decylamine, 1-dodecylamine, 1-octadecylamine; aminoethylpyridine and polyetheramines (for example the Jeffamine® M series, for example Jeffamine® M-600 or Jeffamine® M-1000 from Huntsman Corp. and/or diamines comprising primary and/or secondary amino groups (for example 1,4-diaminobutane, 1,2-bis(methylamino)ethane, 1,3-diaminopentane, 1,6-diaminohexane, 1,8-diaminooctane, 1,9-diaminononane, 1,10-diaminodecane, 1,12-diaminododecane, polyetherdiamines, for example Jeffamine® D series polyetherdiamines, for example Jeffamine® D-230, Jeffamine® D-400, Jeffamine® D-2000, Jeffamine® D-4000; aliphatic triamines comprising primary and/or secondary amino groups, for example triaminononane (4-aminomethyl-1,8-ocanediamine), polyetheramines, for example Jeffamine® T series polyetheramines, for example Jeffamine® T -403, Jeffamine®, T-3000, Jeffamine® T-5000).

The amphiphilic isocyanates may also be produced using amino alcohols. Preference is given to amino-1-butanol; 4-amino-1-butanol and bis(2-hydroxypropyl)amine.

It is also possible to employ mixtures of the abovementioned compounds and compound classes as OH component.

The proportion of amphiphilic isocyanate in the overall reaction mixture comprising components A-F) may be 5 to 70 wt %, preferably 7 to 60 wt % and particularly preferably 8.5 to 50 wt %.

The ratio of isocyanate groups in the polyisocyanate component to isocyanate-reactive groups in the OH component for the production of the arnphiphilic isocyanates is 1:0.001 to 1:0.8, preferably 1:0.05 to 1:0.6 and particularly preferably 1:0.08 to 1:0.5.

The reaction of the polyisocyanates with the OH component to afford the amphiphilic isocyanate may be carried out in the presence of urethanization catalysts such as tin compounds, zinc compounds, amines, guanidines or amidines or in the presence of allophanatization catalysts such as zinc compounds. The reaction is typically performed at 25° C. to 140° C., preferably 60° C. to 100° C., Useful NCO-reactive compounds A) may include in particular polyols, polyamines, poly(amino alcohols) and polythiols.

Examples of polyamines include ethylenediamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 1,3- and 1,4-xylylenediamine α, α, α', α'-tetramethyl-1,3-und-1,4-xylylenediamine and 4,4-diaminodicyclohexylmethane, diethylmethylbenzenediamine (DETDA), 4,4'-diamino-3,3'-dichlorodiphenylmethane (MOCA), dimethylethylenediamine, 1,4-bis (aminomethyl)cyclohexane, 4,4'-diamino-3,3'-dimethyldicyclohexylmethane and 4,4'-diamino-3,5-diethyl-3',5'-diisopropyldicyclohexylmethane. Also useful are polymeric polyamines such as polyoxyalkyleneamines.

Examples of amino alcohols include N-aminoethylethanolamine, ethanolamine, 3-aminopropanol, neopentanolamine and diethanolamine.

Examples of polythiols include di(2-mercaptoethyl)ether, pentaaerythritoltetrakisthioglycolate, pentacrythritoltetrakis (3-mercaptopropionate) and 1,2-bis((2-mercaptoethyl)thio)-3-mercaptopropane.

In a preferred embodiment of the reaction system according to the invention compound A) has a functionality with regard to isocyanates of from 1.8 to 6.0, in particular of ≥2.0.

The polyols may have, for example, a number-average molecular weight Mn of from ≥62 g/mol to ≤8000 g/mol, preferably from ≥90 g/mol to ≤5000 g/mol and more preferably from ≥92 g/mol to ≤1000 g/mol. In the case of a single added polyol the OH number of component A) indicates the OH number of said polyol. In the case of mixtures the average OH number is indicated. This value may be determined in accordance with DIN 53240. The average OH functionality of the cited polyols is, for example, ≥2, for example within the range from ≥2 to ≤6, preferably from ≥2.1 to ≤4 and more preferably from ≥2.2 to ≤3.

Polyether polyols that may be used include, for example, polytetramethylene glycol polyethers as are obtainable by polymerization of tetrahydrofuran by cationic ring opening.

Likewise useful polyether polyols are addition products of styrene oxide, ethylene oxide, propylene oxide, butylene oxides and/or epichlorohydrin onto di- or polyfunctional starter molecules.

Examples of useful starter molecules include water, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol and low molecular weight hydroxyl-containing esters of such polyols with dicarboxylic acids, Useful polyester polyols include inter alia polycondensates of di- and also tri- and tetraols and di- and also tri- and tetracarboxylic acids or hydroxycarhoxylic acids or lactones. Rather than employing the free polycarboxylic acids, it is also possible to use the corresponding polycarboxylic anhydrides or corresponding polycarboxylic esters of lower alcohols for preparing the polyesters.

Examples of useful dials include ethylene glycol, butylene glycol, diethylene glycol, triethylene glycol, polyalkylene glycols such as polyethylene glycol, also 1,2-propandiol, 1,3-propanediol, 1,3-butanediol, 1,4-butanediol, 1,6-hexanediol and isomers, neopentyl glycol or neopentyl glycol hydroxypivalate. In addition, it is also possible to use polyols such as trimethylolpropane, glycerol, erythritol, pentaerythritol, trimethylolbenzene or trishydroxyethyl isocyanurate.

Examples of polycarboxylic acids that may be used include phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, trialonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. It is also possible to use the corresponding anhydrides as an acid source.

Provided that the average functionality of the polyol to be esterified is ≥2, it is also possible to use monocarboxylic acids such as benzoic acid and hexanecarboxylic acid, Examples of hydroxycarboxylic acids that may be used as coreactants in the production of a polyester polyol having terminal hydroxyl groups include hydroxycaproic acid, hydroxybutyric acid, hydroxydecanoic acid, hydroxystearic acid and the like. Suitable lactones include inter alia caprolactone, butyrolactone and homologs.

Polycarbonate polyols that may be used are hydroxyl-containing polycarbonates, for example polycarbonate diols. These are obtainable by reaction of carbonic acid derivatives, such as diphenyl carbonate, dimethyl carbonate or phosgene, with polyols, preferably dials, or by copolymerization of alkylene oxides, for example propylene oxide, with $CO_2$, Examples of such diols include ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, and lactone-modified dials of the abovementioned type.

It is also possible to employ polyetherpolycarbonate diols in place of or in addition to pure poly-carbonate diols.

Polyetherester polyols that may be used are compounds containing ether groups, ester groups and OH groups. Organic dicarboxylic acids having up to 12 carbon atoms are useful for producing the polyetherester polyols, preferably aliphatic dicarboxylic acids having ≥4 to ≤6 carbon atoms or aromatic dicarboxylic acids used singly or in admixture. Examples include suberic acid, azelaic acid, decanedicarboxylic acid, maleic acid, malonic acid, phthalic acid, pimelic acid and sebacic acid and in particular glutaric acid, fumaric acid, succinic acid, adipic acid, phthalic acid, terephthalic acid and isoterephthalic acid. Derivatives of these acids that may be used include, for example, their anhydrides and also their diesters and monoesters with low molecular weight monofunctional alcohols having ≥1 to ≤4 carbon atoms.

Polyether polyols obtained by alkoxylation of starter molecules such as polyhydric alcohols are a further component used for producing polyetherester polyols. The starter molecules are at least difunctional, but may optionally also contain proportions of higher-functional, in particular trifunctional, starter molecules.

Starter molecules include, for example, diols having number-average molecular weights Mn of preferably ≥18 g/mol to ≤400 g/mol or of ≥62 g/mol to ≤200 g/mol such as 1,2-ethanediol, 1,3-propanediol, 1,2-propanediol, 1,4-butanediol, 1,5-pentenediol, 1,5-pentanediol, neopentylglycol, 1,6-hexanediol, 1,7-heptanediol, 1,8-octanediol, 1,10-decanediol, 2-methyl-1,3-propanediol, 2,2-ditriethyl-1,3-propanediol, 3-methyl-1,5-pentanediol, 2-butyl-2-ethyl-1,3-propanediol, 2-butene-1,4-diol and 2-butyne-1,4-diol, ether dials such as diethylene glycol, triethylene glycol, tetraethylene glycol, dibutylene glycol, tributylene glycol, tetrabutylen glycol, dihexylene trihexylene glycol, tetrahexylene glycol and oligomeric mixtures of alkylene glycols, such as diethylene glycol.

In addition to the dials, polyols having number-average functionalities of >2 to ≤8, or of ≥3 to ≤4 may also be employed, examples being 1,1,1-trimethylolpropane, triethanolamine, glycerol, sorbitan and pentaerythritol and also trial- or tetraol-started polyethylene oxide polyols having average molecular weights of preferably ≥62 g/mol to ≤400 g/mol or of ≥92 g/mol to ≤200 g/mol.

Polyetherester polyols may also be produced by alkoxylation of reaction products obtained by reaction of organic dicarboxylic acids and dials. Derivatives of these acids that may be used include, for example, their anhydrides, for example phthalic anhydride.

Polyacrylate polyols are obtainable by free-radical polymerization of hydroxyl-containing, olefinically unsaturated monomers or by free-radical copolymerization of hydroxyl-containing, olefinically unsaturated monomers with optionally other olefinically unsaturated monomers. Examples thereof include ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Useful hydroxyl-containing, olefinically unsaturated monomers are in particular 2-hydroxyethyl acrylate, 2-hydroxyethyl methacrylate, the hydroxypropyl acrylate isomer mixture obtainable by addition of propylene oxide onto acrylic acid, and the hydroxypropyl methacrylate isomer mixture obtainable by addition of propylene oxide onto methacrylic acid. Terminal hydroxyl groups may also be in protected form. Useful free-radical initiators are selected from the group of azo compounds, for example azoisobutyronitrile (AIBN), or from the group of peroxides, for example di-tert-butyl peroxide.

in a further embodiment the isocyanate-reactive component A) comprises a polyetherester polyol having a hydroxyl number of ≥200 mg KOH/g to ≤600 mg KOH/g and a short-chain polyol having a hydroxyl number of ≥800 mg KOH/g. Suitable polyetherester polyols are, inter alia, difunctional polyetherester polyols obtained by addition of alkylene oxides, in particular ethylene oxide, onto a mixture of phthallic anhydride, diethylene glycol and ethylenediamine and having an OH number of ≥275 mg KOH/g to ≤325 mg KOH/g. Such products are obtainable from Bayer MaterialScience AG under the trade name Desmophen® VP.PU 1431, The polyester polyol may also have an OH number of ≥290 mg KOH/g to ≤320 mg KOH/g. Short-chain polyols are in particular polyols having ≥2 to ≤6 carbon atoms. Glycerol is preferred. This compound as an OH number of 1827 mg KOH/g. Addition of the short-chain polyol makes it possible to conveniently increase the polarity of the polyol phase, In one embodiment component A) is composed entirely or in part of isocyanate-reactive compounds A2) which likewise comprise a hydrophobic part and a hydrophilic part and have an average hydroxyl functionality of more than 1. These compounds A2) may likewise provide surfactant activity. The hydrophobic part of the compounds A2) comprises a saturated or unsaturated hydrocarbon chain having at least 6 carbon atoms and wherein the hydrophilic part comprises alkylene oxide units and/or ester units. Examples of compounds A2) are described in WO 2012/146568.

Examples of compounds A2) include alkoxylated alkanols, alkoxylated alkylphenols, alkoxylated fatty acids, fatty acid esters esterified with diols or triols.

The compounds A2) have an HLB value between 4 and 18, preferably between 8 and 16 and particularly preferably between 10 und 15. The hydrophobic part comprises a saturated or unsaturated hydrocarbon chain having at least 6 carbon atoms, preferably at least 8 carbon atoms, by preference at least 12 carbon atoms and particularly preferably at least 14 carbon atoms.

Saturated hydrocarbon chains in the isocyanate-reactive compound A2) are obtainable for example by esterification of polyols with saturated fatty acids. One example of a useful saturated fatty acid is 2-ethylhexanoic acid. It will be appreciated that unsaturated hydrocarbon chains may also contain saturated units —$CH_2$- as well as units of the form —(H)C═C(H)—. This may be achieved by esterification with unsaturated fatty acids. One example of a useful unsaturated fatty acid is oleic acid ((Z)-9-octadecenoic acid). It is also possible to employ mixtures of fatty acids obtained from natural oils, such as soybean oil or colza oil for example.

The isocyanate-reactive compound A2) is preferably a compound liquid at 20° C. preferably having a viscosity of less than 15 000 mPas, particularly preferably less than 5000 mPas. Viscosity may be determined in accordance with DIN 53019 for example.

The hydrophilic region of the isocyanate-reactive compound A2) preferably comprises ethylene oxide units —[—CH2-CH2-O]— and/or carboxylic ester units, The compound A2) is obtainable, for example, by partial alkoxylation of an at least trifunctional polyol in order that an OH group of the polyol is available for esterification with a fatty acid. The compound A2) is moreover obtainable by esterification of oleic acid with adipic acid, trimethylolpropane and/or diethylene glycol for example. The isocyanate-reactive compound A2) preferably has an average number of OH groups per molecule of from 1.5 to 5, particularly preferably 1.8 to 3.5 and 2.5 to 3.5.

In a further embodiment the isocyanate-reactive compound A2) has a hydroxyl number of ≤50 mg KOH/g to ≤500 mg KOH/g. This value may be determined in accordance with DIN 53240. Preferable ranges for the OH numbers are ≥70 mg KOH/g to ≤400 mg KOH/g and with particular preference 50 mg KOH/g to ≤100 mg KOH/g and ≥100 mg KOH/g to ≤300 mg KOH/g. In the case of mixtures this refers to the average OH number.

These embodiments may be combined with one another as desired. Preference is given, inter alia, to an isocyanate-reactive compound A2) having a hydroxyl number of ≥50 mg KOH/g to ≤100 mg KOH/g and an average number of OH groups per molecule of 1.8 to 3.5.

In a further embodiment the isocyanate-reactive compound A2) is present in a proportion of ≥0.5% by weight to ≤40% by weight based on the total weight of the mixture. The proportion is preferably ≥2% by weight to ≤30% by weight and mare preferably ≥5% by weight to ≤20% by weight.

In a further embodiment the hydrophilic part of the isocyanate-reactive compound A2) comprises an intro-esterified fatty acid and the proportion of the intro-esterified fatty acid is ≥0.5% by weight to ≤25% by weight based on the total weight of the mixture. Preferred proportions are ≥2% by weight to ≤15% by weight, particular preference being given to ≥4% by weight to ≤10% by weight.

In a further embodiment the isocyanate-reactive compound A2) is obtainable from the reaction of a partially alkoxylated polyol with a fatty acid.

It is preferable when the isocyanate-reactive compound A2) comprises a carboxylic ester of an alkoxylated sorbitan.

It is further preferable when the isocyanate-reactive compound A2) is an ester of general formula (I):

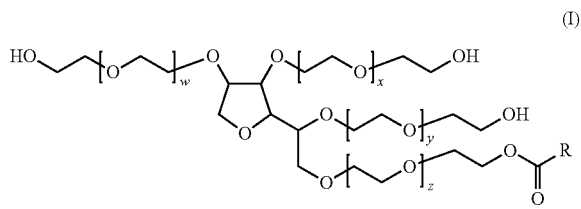

where w+x+y+z≥16 to ≤22 and R is a saturated or unsaturated hydrocarbon radical having ≥12 to ≤18 carbon atoms.

A particularly preferred example is polysorbate 80 which is described by formula (II):

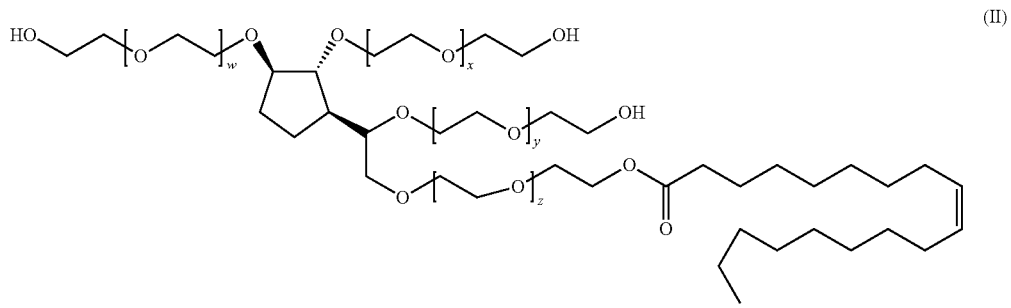

where w+x+y+z=20.

In one embodiment the mixture additionally comprises a further surfactant component E).

Useful surfactants E) are initially not subject to any restrictions in terms of their selection. Conveniently, the surfactants allow the blowing agent to form emulsions or microemulsions in the isocyanate-reactive phase. Particularly useful surfactants include for example alkoxylated alkanols such as ethers of linear or branched alkanols having ≥6 to ≤30 carbon atoms with polyalkylene glycols having ≥5 to ≤100 alkylene oxide units, alkoxylated alkylphenols, alkoxylated fatty acids, carboxylic esters of an alkoxylated sorbitan (especially Polysorbate 80), fatty acid esters, polyalkyleneamines, alkyl sulfates, phosphatidylinositols, fluorinated surfactants, surfactants comprising polysiloxane groups such as polysiloxane-polyoxyalkylene copolymers and/or bis(2-ethyl-1-hexyl)sulfosuccinate. Examples of such surfactants include alkyl sulfates or bis(2-ethyl-1-hexyl) sulfosuccinate. The surfactant component E) is preferably a compound liquid at 20° C. preferably having a viscosity of less than 15 000 mPas, particularly preferably less than 5000 mPas. Viscosity may be determined in accordance with DIN 53019 for example.

The surfactant component E) may have, for example, a number-average molecular weight Mn of from ≥100 g/mol to ≤8000 g/mol, preferably from ≥200 g/mol to ≤5000 g/mol and more preferably from ≥500 g/mol to ≤2500 g/mol.

In one embodiment the hydrophobic part of the surfactant component E) comprises a saturated or unsaturated hydrocarbon chain having at least 4 carbon atoms, preferably at least 6 carbon atoms, by preference at least 12 carbon atoms and particularly preferably at least 14 carbon atoms. Saturated or unsaturated hydrocarbon chains of the surfactant component B) may be produced, for example, by alkoxylation of fatty acid alcohols or fatty acids with ethylene oxide or propylene oxide.

The production of the polyurethane foam employs supercritical or near-critical blowing agent B). Conditions are near-critical in the context of the present invention when the following condition is satisfied: $(T_c-T)/T \leq 0.4$ and/or $(p_c-p)/p \leq 0.4$. Here, T is the temperature prevailing in the process, $T_c$ is the critical temperature of the blowing agent or blowing agent mixture, p is the pressure prevailing in the process and $p_c$ is the critical pressure for the blowing agent or blowing agent mixture. Conditions are preferably near-critical when: $(T_c-T)/T \leq 0.3$ and/or $(p_c-p)/p \leq 0.3$ and particularly preferably $(T_c-T)/T \leq 0.2$ and/or $(p_c-p)/p \leq 0.2$. Without wishing to be tied to any one theory, it is believed that the choice of suitable surfactant components ensures that emulsions or microemulsions of the supercritical or near-critical blowing agent form in the phase comprising isocyanate-reactive components.

The blowing agent may preferably form its own phase in the reaction mixture. Supercritical carbon dioxide may be used for example. The carbon dioxide may be formed during the reaction to form the polyurethane foam, for example as a result of the reaction of isocyanates with water or with acids. Examples of further lowering agents are linear $C_1$-$C_6$-hydrocarbons, branched $C_4$-$C_6$-hydrocarbons and cyclic $C_3$-$C_6$-hydrocarbons. Specific examples of blowing agents are methane, ethane, propane, n-butane, isobutane, n-pentane, isopentane, cyclopentane, isohexane and/or cyclohexane. Further examples are the partially or perfluorinated derivatives of methane, ethane, propane, n-butane, isobutane, n-pentane, isopentane, cyclopentane, hexane, isohexane, 2,3-dimethylbutane and/or cyclohexane. Preference is given to using carbon dioxide or a blowing agent mixture having a carbon dioxide content of more than 30% by weight, preferably more than 50% by weight and more preferably more than 70% by weight.

The proportion of the blowing agent in the reaction mixture comprising all isocyanate-reactive components may he, for example, $\geq 5\%$ by weight to $\leq 60\%$ by weight based on the isocyanate-reactive components. The proportion of the blowing agent in the reaction mixture comprising components A), B), C), D), E) and F) may be $\geq 3\%$ by weight to $\leq 60\%$ by weight, preferably $\geq 4\%$ by weight to $\leq 40\%$ by weight and particularly preferably $\geq 5\%$ by weight to $\leq 30\%$ by weight for example.

Component C) is a polyisocyanate, i.e. an isocyanate having an NCO functionality of $\geq 2$, A reaction mixture, then, can therefore react to give polyurethane, polyurea or else polyisocyanurate foams.

This reaction mixture may be produced directly in a mixing head for example.

Examples of useful polyisocyanates of this type include 1,4-butylene diisocyanate, 1,5-pentane diisocyanate, 1,6-hexamethylene diisocyanate (HDI), isophorone diisocyanate. (PDI), 2,2,4- and/or 2,4,4-trimethylhexamethylene diisocyanate, the isomeric bis(4,4'-isocyanatocyclohexyl)methanes or mixtures thereof with any desired isomer content, 1,4-cyclohexylene diisocyanate, 1,4-phenylene diisocyanate, 2,4- and/or 2,6-tolylene diisocyanate (TM), 1,5-naphthylene diisocyanate, 2,2'- and/or and/or 4,4'-diphenylmethane diisocyanate (MDI) and/or higher homologs (polymeric MDI), 1,3- and/or 1,4-bis(2-isocyanatoprop-2-yl)benzene (TMXDI), 1,3-bis(isocyanatomethyl)benzene (XDI), and also alkyl 2,6-diisocyanatohexanoates (lysine diisocyanates) having $C_1$ to $C_6$-alkyl groups. An isocyanate from the diphenylmethane diisocyanate series is preferred in this case.

In addition to the abovementioned polyisocyanates, it is also possible to use proportions of modified diisocyanates of uretdione, isocyanurate, urethane, carbodiimide, uretonimine, allophanate, biuret, amide, iminooxadiazinedione and/or oxadiazinetrione structure and also unmodified polyisocyanate having more than 2 NCO groups per molecule, for example 4-isocyanatomethyl-1,8-octane diisocyanate (nonane triisocyanate) or triphenylmethane 4,4°,4"-triisocyanate.

The isocyanate may be a prepolymer obtainable by reacting an isocyanate having an NCO functionality of $\geq 2$ and polyols having a molecular weight of $\geq 62$ g/mol to $\leq 8000$ g/mol and OH functionalities of $\geq 1.5$ to $\leq 6$.

It will be appreciated that still further customary auxiliary and added substances F) such as catalysts, flame retardants, release agents, tillers and the like may be used to produce the polyurethane foam.

The components A), B), C), D) and optionally F) and also optionally F) are preferably present in amounts of:
A) 0-60 wt %, in particular 10 to 60 wt %, preferably 15 to 50 wt %
B) 2 to 40 wt %, preferably 4 to 15 wt %
The sum of the proportions of C+D) 20 to 70 wt %, preferably 30 bis 60 wt %, wherein the ratio of the weight percentages of C): 0) is 0:100 to 90:10, preferably 1:99 to 75:25
E) 0 to 20 wt %, preferably 1 to 20 wt %, particularly preferably 1 his 15 wt %
F) 0 to 10 wt %, preferably 0.001 to 10 wt %

Percentages by weight ("wt %") relate in each case to the composition of the entire reaction mixture unless otherwise stated. The sum of all percentages by weight in the overall composition amounts to 100 wt %.

In the case where the proportion of component A is not 0, the number of NC( )groups in the polyisocyanate component C) and in the amphiphilic isocyanate 0) and the number of isocyanate-reactive groups of component A) may be in a numerical ratio of, for example, $\geq 50:100$ to $\leq 500:100$ relative to each other. This index may also be in the range from $\geq 160:100$ to $\leq 330:100$ or else $\geq 80:100$ to $\leq 140:100$.

In accordance with the invention the blowing agent B) is mixed with the amphiphilic isocyanate D), the blowing agent being transferred into a supercritical or near critical state. Component B) may also be provided in a mixture of the components C) and D).

Component B) is completely or partially emulsified in the amphiphilic isocyanate D) or in a mixture of the isocyanate components C) and D). Some of component B) may also be emulsified in the NCO-reactive compound A) which comprises a component A2).

The polyurethane system comprising the components A), B), C), D) and optionally E) and optionally F) may then be obtained by admixing component A) and optionally further components, with the exception of the isocyanate components C) and D), with the amphiphilic isocyanate and the polyisocyanate in a high-pressure mixing head for example, wherein at least the amphiphilic isocyanate D)/the mixture of amphiphilic isocyanate D) and polyisocyanate C) contain the blowing agent in a state that is supercritical or near-critical for the blowing agent and the conditions in the mixing head are supercritical or near-critical for the blowing agent.

In one embodiment component A), optionally containing further components, may likewise contain a blowing agent in a supercritical or near-critical state. This is possible when component A) contains NCO-reactive compounds A2) which can provide surfactant activity or when a component E) is additionally present.

Suitable pressures for producing the polyurethane foam may be in the range from ≥40 bar to ≤300 bar for example. Suitable temperatures are, for example, ≥10° C. to ≤110° C. and preferably ≥25° C. to ≤80° C. Particular preference is given to pressures and temperatures above the critical point of $CO_2$, i.e. ≥73.7 bar and ≥31° C.

In a further embodiment the polyisocyanate component C) comprises monomeric and/or polymeric diphenylmethane 4,4'-diisocyanate. A polyisocyanate of this type is obtainable, for example, from Bayer MaterialScience under the trade name Desmodur® 44V70L, as a mixture of diphenylmethane 4,4'-diisocyanate (MDI) with isomers and higher-functional homologs.

In a further embodiment the polyurethane foam has an apparent density of ≥20 kg/m$^3$ to ≤160 kg/m$^3$. The apparent density may be determined according to DIN EN 1602 and is preferably ≥30 kg/m$^3$ to ≤120 kg/m$^3$ and more preferably ≥30 kg/m$^3$ to ≤80 kg/m$^3$. Preferred applications for the foam according to the invention are in thermal insulation, for example for the production of insulation panels, metal composite panels or for refrigerator insulation.

The present invention further provides a process for producing a polyurethane foam which comprises the steps of:
  introducing the mixture comprising the components A), B), C), D) and optimally E) and optionally F) into a closed mold, wherein the closed mold is set up such that its internal volume and/or the pressure prevailing in its interior can be changed by external agency after the mixture has been introduced;
  dwelling the mixture comprising components A), B) C), D), and optionally E) and optionally F) in the closed mold for a predetermined duration of ≥0 seconds; and
  increasing the inner volume of the closed mold and/or reducing the pressure prevailing in the interior of the closed mold by external agency.

One embodiment of the process according to the invention comprises the steps of
  providing a mixture of compounds A), B), C), D) and optionally E) and optionally F) under elevated pressure, for example in a mixing head; and
  discharging the mixture from, for example, the mixing head, wherein during discharging the pressure prevailing in the mixture is reduced to atmospheric pressure.

During the step of discharging the mixture from the mixing head the pressure prevailing in the mixture is reduced to atmospheric pressure. Atmospheric pressure is to be understood here as meaning in particular a pressure from ≥0.9 bar to ≤1.1 bar. This converts the blowing agent into the subcritical state and preferably into the gaseous state. For example, the reaction mixture may simply be introduced into an open mold from the mixing head or may be used in a continuous manner for the production of sheets, as for example through free-foaming systems or twin-conveyor systems. The present invention expressly also comprehends the possibility that, between the emergence of the reaction mixture from the mixing head and the depressurization to atmospheric pressure, there may also be intermediate stations where the prevailing pressure is between the pressure in the mixing head and atmospheric pressure.

In one embodiment of the process according to the invention a pressure of ≥40 bar to ≤200 bar, preferably a pressure of ≥60 bar to ≤150 bar and particularly preferably a pressure of ≥70 bar to ≤120 bar prevails after the step of providing the mixture of compounds A), B), C), D) and optionally F) and optionally F). This state may prevail in particular in a mixing head and downstream of a mixing head. The pressure can also be ≥80 bar to ≤120 bar. Such pressures may maintain supercritical or near-critical conditions for the blowing agent used.

In a further embodiment of the process according to the invention, means are disposed in the mixing head or downstream of the mixing head for elevating the flow resistance in the step of discharging the mixture comprising components A), B), C) and D) and optionally E) and optionally F). Examples of such means include perforated plates, grids, slot diffusers and/or sieves arranged downstream of a mixing chamber of the mixing head. Increasing the flow resistance makes it possible to intentionally influence the pressure of the reaction mixture prior to discharge from the mixing head. The pressure thus established may be lower than the pressure during the mixing of the components of the reaction mixture. This makes it possible to influence the formation and expansion of blowing agent droplets or of small bubbles of blowing agent. Such means are described in WO 2001/98389 A1 for example.

The embodiments set out hereinabove are intended to describe the invention without the invention being limited thereto. The embodiments may be combined as desired unless the contrary is apparent from the context.

GLOSSARY

Desmodur® PU1806: mixture of diphenylmethane 2,4'-diisocyanate and diphenylmethane 4,4-diisocyanate (MDI) from Bayer Materialscience AG.

Isophthaloyl chloride, CAS No. 99-63-8, obtainable from Fluka

Methoxypolyethylene glycol 350, CAS No. 9004-74-4, obtainable from Fluka

Ethylhexanol, CAS No. 104-76-7, obtainable from Fluka

Production of the Amphiphilic Polyisocyanates

EXAMPLE 1

412.5 g of Desmodur® PU1806 and 1.1 g of isophthaloyl chloride were initially charged and heated to 40° C. 137.5 g of methoxypolyethylene glycol 350 were added dropwise over 20 minutes with stirring. The temperature was then increased to 80° C. and the mixture was stirred for a further 2 hours. 551.2 g of an amphiphilic polyisocyanate were obtained (NCO content: 22.05%).

EXAMPLE 2

355.6 g of Desmodur® PU1806 and 1.1 g of isophthaloyl. chloride were initially charged and heated to 40° C., 192.5 g of methoxypolyethylene glycol 350 were added dropwise over 20 minutes with stirring. The temperature was then increased to 80° C. and the mixture was stirred for a further 2 hours, 552.10 g of an amphiphilic polyisocyanate were obtained (NCO content 17.18%).

EXAMPLE 3

223.95 g of Desmodur® PU1806 and 1.19 g of isophthaloyl chloride were initially charged and heated to 40° C., 74.85 g of ethylhexanol were added dropwise over 20 minutes with stirring. The temperature was then increased to 80° C. and the mixture was stirred for a further 2 hours, 300 g of an amphiphilic polyisocyanate were obtained (NCO content 16.74%).

EXAMPLES 4

The amphiphilic isocyanate from example 1 is mixed with 10 wt % of $CO_2$ (based on the amphiphilic isocyanate) at 50° C. and p=130 bar. This affords a mixture which, although appearing monophasic to the eye, can be revealed to be a microemulsion using light scattering from a laser beam (the structure of the mixture causes scattering of the light and a laser beam is visible in the phase, see FIG. 1).

EXAMPLES 5 AND 6

Example 4 is repeated with the amphiphilic isocyanates from examples 2 and 3, giving the same result in each case (see FIG. 1).

The invention claimed is:

1. A nanocellular polyurethane, polyisocyanurate or polyurea foam obtained from the reaction of a mixture comprising:
   A) an isocyanate-reactive compound ("NCO-reactive compound");
   B) a blowing agent selected from the group comprising linear, branched or cyclic C1- to C6-hydrocarbons, linear, branched or cyclic C1- to C6-(hydro)fluorocarbons, $N_2$, $O_2$, argon and/or $CO_2$, wherein the blowing agent B) is in the supercritical or near-critical state;
   C) a polyisocyanate;
   D) an amphiphilic isocyanate having an HLB value of 3 to 16, a hydrophobic portion comprising a radical of an alcohol comprising a monohydric alcohol having a saturated or unsaturated hydrocarbon chain having at least 4 carbon atoms, and a hydrophilic portion comprising a radical of an alcohol comprising a monofunctional polyalkylene oxide; and
   E) optionally a surfactant; and
   F) optionally further auxiliary/added substances,
   wherein the blowing agent B) is stabilized in a microemulsion with component D).

2. The polyurethane, polyisocyanurate or polyurea foam as claimed in claim 1, wherein the proportion of the amphiphilic isocyanate is 5 to 70 wt % based on the weight of the overall composition.

3. The polyurethane, polyisocyanurate or polyurea foam as claimed in claim 1, wherein some or all of component A) is component A 2) which comprises a hydrophobic part and a hydrophilic part and has an average hydroxyl functionality of more than 1,
   wherein the hydrophobic part comprises a saturated or unsaturated hydrocarbon chain having at least 6 carbon atoms and
   wherein the hydrophilic part comprises alkylene oxide units and/or ester units.

4. The polyurethane, polyisocyanurate or polyurea foam as claimed in claim 1, wherein the polyisocyanate component C) comprises monomeric and/or polymeric diphenylmethane 4,4'-diisocyanate.

5. The polyurethane, polyisocyanurate or polyurea foam as claimed in claim 1 having an apparent density of >20 $kg/m^3$ to <160 $kg/m^3$.

6. A process for producing a polyurethane, polyisocyanurate or polyurea foam as claimed in claim 1, comprising the steps of:
   introducing the mixture comprising the components A), B), C), D) and optionally E) and optionally F) wherein some or all of component B) is provided in the amphiphilic isocyanate D) or in a mixture of isocyanate components C) and D) into a closed mold, wherein the closed mold is set up such that its internal volume and/or the pressure prevailing in its interior can be changed by external agency after the mixture has been introduced;
   dwelling the mixture comprising components A), B), C), D), and optionally E) and optionally F) in the closed mold for a predetermined duration of >0 seconds; and
   increasing the inner volume of the closed mold and/or reducing the pressure prevailing in the interior of the closed mold by external agency.

7. The process for producing a polyurethane, polyisocyanurate or polyurea foam as claimed in claim 1, comprising the steps of:
   providing a mixture of compounds A), B) C), D) and optionally E) and optionally F) as is described in claim 1 under elevated pressure; and
   discharging the mixture, wherein during discharging the pressure prevailing in the mixture is reduced to atmospheric pressure.

8. The process as claimed in claim 6, wherein some of component B) is provided in the NCO-reactive compound A) comprising a component A2).

* * * * *